United States Patent
Yuan et al.

(10) Patent No.: US 12,214,534 B2
(45) Date of Patent: Feb. 4, 2025

(54) INJECTION MOLDING WARP PREDICTION

(71) Applicant: Autodesk, Inc., San Francisco, CA (US)

(72) Inventors: Zhongshuang Yuan, Ithaca, NY (US); Alexander Bakharev, Lilydale (AU); Franco Costa, Melbourne (AU); Jin Wang, Ithaca, NY (US)

(73) Assignee: Autodesk, Inc., San Francisco, CA (US)

( * ) Notice: Subject to any disclaimer, the term of this patent is extended or adjusted under 35 U.S.C. 154(b) by 276 days.

(21) Appl. No.: 17/959,221

(22) Filed: Oct. 3, 2022

(65) Prior Publication Data

US 2023/0105651 A1    Apr. 6, 2023

Related U.S. Application Data

(60) Provisional application No. 63/252,102, filed on Oct. 4, 2021.

(51) Int. Cl.
*B29C 45/76* (2006.01)
*B29C 45/00* (2006.01)

(52) U.S. Cl.
CPC ...... *B29C 45/7693* (2013.01); *B29C 45/0025* (2013.01); *B29C 2945/76103* (2013.01);
(Continued)

(58) Field of Classification Search
CPC ............ B29C 45/7693; B29C 45/0025; B29C 2945/76103
See application file for complete search history.

(56) References Cited

U.S. PATENT DOCUMENTS

| 8,392,160 B2 | 3/2013 | Brincat et al. |
| 8,463,584 B2 | 6/2013 | Yu |

FOREIGN PATENT DOCUMENTS

| JP | H07-186228 | 7/1995 |
| JP | 2004-171045 | 6/2004 |

(Continued)

OTHER PUBLICATIONS

[No Author Listed], "Autodesk Moldflow 2021 Scandium Technology Preview," Autodesk, 2020, 50 pages.
(Continued)

*Primary Examiner* — John J DeRusso
(74) *Attorney, Agent, or Firm* — Fish & Richardson P.C.

(57) ABSTRACT

Methods, systems, and apparatus, including medium-encoded computer program products, for injection molding warp prediction include: obtaining a mold model and measured shrinkage data for at least one material, predicting an amount of warpage for a part manufactured using the mold by computational simulation of an injection molding process, where the computational simulation uses an internal residual stress model for the part that uses calibrated values for both a coefficient of thermal expansion and an elastic modulus and/or a Poisson's ratio of the at least one material, in at least one direction, for at least thermal stress due to cooling and pressure compensation during and/or after a packing phase of the injection molding process, in accordance with the measured shrinkage data for the at least one material, and providing the amount of warpage predicted for the part manufactured using the mold.

50 Claims, 6 Drawing Sheets

(52) U.S. Cl.
CPC ............... *B29C 2945/76431* (2013.01); *B29C 2945/76498* (2013.01); *B29C 2945/76588* (2013.01)

(56) References Cited

FOREIGN PATENT DOCUMENTS

| | | |
|---|---|---|
| JP | 2006-313556 | 11/2006 |
| JP | 2018-083420 | 5/2018 |

OTHER PUBLICATIONS

[No Author Listed], "Autodesk Moldflow Insight Technology Preview 2017," Autodesk, 2016, 28 pages.

Extended European Search Report in European Appln. No. 22199684.6, dated Feb. 13, 2023, 8 pages.

Kennedy et al., "High Accuracy Shrinkage and Warpage Predication for Injection Molding," ANTEC 2002 Annual Technical Conference, 2002, 7 pages.

Walsh, "Shrinkage and Warpage Prediction for Injection Molded Components," Journal of Reinforced Plastics and Composites, Jul. 1993, 12:769-777.

"Digimat MX User's Guide", Jul. 2021, MSO Software Corporation, U.S.A., Jul. 6, 2021.†

"Digimat_2020_User's_Manual", 2020 MSC Software Belgium SA, May 2020.†

Moldflow Insight Forum, Micro-mechanics model without proper material data ??? https://forums.autodesk.com/15/moldflow-insight-forum/micro-mechanics-model-without-proper-material-data/td-p/4610056, Nov. 11, 2013.†

† cited by third party

INJECTION MOLDING WARP PREDICTION

CROSS-REFERENCE TO RELATED APPLICATIONS

This application claims the benefit of priority of U.S. Patent Application No. 63/252,102, entitled "INJECTION MOLDING WARP PREDICTION", filed Oct. 4, 2021.

BACKGROUND

This specification relates to computer-implemented production simulations, including simulations of injection molding. The "injection molding" as used in this application includes producing parts by injecting molten material into a mold, as well as overmolding, compression molding, compression-injection molding and insert molding manufacturing processes.

In various industries, injection molds are used to manufacture parts, where a material (e.g., plastic resin, such as thermoplastic, thermosetting or elastomer material, metal, etc.) is prepared in a liquid form (e.g., heated and melted), and then piped or injected under pressure into the voids of an empty mold (also referred to as a die) and then cools or undergoes a chemical reaction so as to permanently harden in the shape of the hollow mold cavity. The cavity of the mold has a shape corresponding to the part to be manufactured, and other components often include a mold core that fits into the cavity and a clamp that attaches to the mold to produce an appropriate amount of pressure on the liquid in the mold cavity as the liquid is solidified. In addition, some molds have associated cooling lines (pipes or channels) that guide a cooling fluid in proximity to the mold cavity to assist in solidifying the liquid. Other molds have associated heating elements such as electric heating elements or heating lines (pipes or channels) that guide a heating fluid in proximity to the mold cavity to elevate the mold cavity temperature, either to initiate a chemical reaction in the material or to delay the cooling process.

The solidified and set material is removed from the mold, forming the near finished product, piece, or part in the shape of the mold. Injection molding can be an efficient method of production in that it typically allows manufacturers to reuse one or more dies and reproduce, with precision, the products formed in the die. Typically, the initial design and manufacture of the mold is quite costly. Much is invested to design and perfect a mold that will be re-used, in some instances, millions of times over the course of its life. Consequently, injection molding is often characterized by high efficiencies of scale, the return on investment for a particular die dependent on the durability and lasting precision of the die. As a result, typical injection mold cavity design is at the same time a critically important, but difficult and costly process.

Thousands of polymer materials exist capable of being used in injection molding applications. In some instances, the material that is to be used in an injection molding application can even influence the design of a given mold cavity and vice versa. For instance, some high viscosity materials, in their molten form, may perform poorly in a mold cavity machined with narrow gates, runners, and cavity voids. Additionally, the geometry of the mold cavity can also influence the physical properties of plastic parts manufactured using the mold. Indeed, two parts having identical dimensions and made from the same thermoplastic material but molded under different conditions, with different gate locations, for instance, can possess different stress and shrinkage levels. As a consequence, mold cavity engineers often seek to optimize a mold cavity design in order to produce the most commercially acceptable product, such as by using the systems and techniques described in U.S. Pat. Nos. 8,392,160 and 8,463,584, which are hereby incorporated by reference, to simulate injection of material into modeled mold cavities.

In addition, various commercial cooling processes seek to control the precise heating and cooling requirements of each injection molding cycle using a thermocouple located in the mold to adjust cooling and heating based on measurements of temperature in the mold. Further, to reduce cycle time, which raises manufacturing costs, it is common to maintain reduced or no flow rate (in the cooling lines) during the filling phase, and then pump very cold coolant through the cooling channels at a very high flow rate once the mold is filled in order to accelerate the cooling phase. The cooling phase usually forms the bulk of the injection molding cycle, and by reducing this phase, production costs are lowered and the hot mold during filling enhances part quality.

However, each different material typically has a different coefficient of thermal expansion (CTE) which can be temperature-dependent. Thus, the injection molding process can cause warping of the manufactured part due to thermal stress created in the part as a result of undesirable shrinkage during cooling. To compensate for this shrinkage, the injection molding process often includes a packing phase after filling the mold cavity during which additional polymer melt is forced into the cavity under high pressure to compensate for the anticipated thermal shrinkage. In the case of compression molding, the process often includes a pressure holding phase after the compression phase. In order to predict the final part shape and dimensions, an accurate prediction of the resulting residual stress is required. The residual stress is the balance of thermal stress (shrinkage) and packing or compression pressure (shrinkage compensation), both of which are non-uniform throughout the molded part. In an attempt to improve prediction accuracy, Autodesk, Inc. released a software product that used part thickness information and measured shrinkage data in its three-dimensional (3D) residual stress model used for shrinkage calculation during thermoplastics injection molding and thermoplastics overmolding simulation, where the measured shrinkage data was used to calibrate CTE values in the 3D residual stress model.

SUMMARY

This specification describes technologies relating to computer-implemented production simulations, including prediction of injection molding warping based on material properties adjusted in accordance with shrinkage test data.

In general, one or more aspects of the subject matter described in this specification can be embodied in one or more methods (and also one or more non-transitory computer-readable mediums tangibly encoding a computer program operable to cause data processing apparatus to perform operations) that include: obtaining, by a numerical injection molding simulation program, a three-dimensional model of a mold and measured shrinkage data for at least one material; predicting, by the numerical injection molding simulation program, an amount of warpage for a part manufactured using the mold by computational simulation of an injection molding process, wherein the computational simulation uses an internal residual stress model for the part that uses calibrated values for both a coefficient of thermal expansion and an elastic modulus of the at least one material, in at least one direction (e.g., one, two or three directions), for at least thermal stress due to cooling and pressure compensation during and/or after a packing phase or holding phase of the injection molding process, in accordance with the measured shrinkage data for the at least one material; and providing the amount of warpage predicted for the part manufactured using the mold.

Obtaining the measured shrinkage data can include loading the measured shrinkage data for the at least one material, at runtime for the computational simulation, from a database containing data about shrinkage for injection molded test samples, wherein the injection molded test samples have been produced under different molding conditions for the at least one material. The different molding conditions can include different injection velocities, different mold pressure levels, and different polymer melt and mold temperatures used with different part geometries. The at least one material can include different polymer material grades. The computational simulation can calibrate the coefficient of thermal expansion in both a direction of flow of the at least one material and a direction perpendicular to the direction of flow based on a magnitude of shrinkage measured in each of the direction of flow and the direction perpendicular to the direction of flow (and optionally in a direction of thickness, based on measured data, in addition to the flow direction and the in-plane perpendicular direction), and the computational simulation can calibrate the elastic modulus of the at least one material in both the direction of flow and the direction perpendicular to the direction of flow at an elevated temperature based on an observed sensitivity of measured shrinkage, in each of the direction of flow and the direction perpendicular to the direction of flow, due to variations in packing pressure.

The predicting can include: finding, in the measured shrinkage data, shrinkage measurements that differ for the at least one material only in packing pressure; determining a shrinkage measurement case, from the shrinkage measurements, that has a thickness corresponding to a thickness of the at least one material at a location in the three-dimensional model of the mold; estimating, for the shrinkage measurement case, effective parallel and perpendicular compressibilities for the thickness for the at least one material; calculating calibrated parallel and perpendicular elastic moduli from the effective parallel and perpendicular compressibilities; predicting a residual stress at the location using the calibrated parallel and perpendicular elastic moduli for the at least one material and the coefficient of thermal expansion; and using the residual stress at the location in the computational simulation of the injection molding process. The at least one material can be a fiber reinforced polymer compound, and the computational simulation can calibrate the coefficient of thermal expansion and the elastic modulus for a polymer matrix of the fiber reinforced polymer compound. Further, the simulation can calculate the effective coefficient of thermal expansion and elastic modulus of the fiber reinforced polymer compound in each location of the molding according to simulated fiber orientation and the calibrated coefficient of thermal expansion and elastic modulus for the polymer matrix.

The three-dimensional model of the mold can define cooling lines integrated into the mold and can include a three-dimensional model of both a cavity of the mold and a core of the mold. The numerical injection molding simulation program can be part of a numerical structural modelling program. The providing can include presenting the amount of warpage predicted for the part on a display device along with an alert that the amount of warpage predicted for the part exceeds a predefined threshold. The providing can include presenting the amount of warpage predicted for the part on a display device along with a suggested change in packing pressure control for the mold during the injection molding process to reduce or eliminate warpage of the part. The providing can include presenting the amount of warpage predicted for the part on a display device along with a suggested change to the three-dimensional model of the mold to reduce or eliminate physical mold prototyping cycles.

One or more aspects of the subject matter described in this specification can also be embodied in one or more systems including: a data processing apparatus including at least one hardware processor; and a non-transitory computer-readable medium encoding instructions configured to cause the data processing apparatus to perform operations including: obtaining, by a numerical injection molding simulation program, a three-dimensional model of a mold and measured shrinkage data for at least one material; predicting, by the numerical injection molding simulation program, an amount of warpage for a part manufactured using the mold by computational simulation of an injection molding process, wherein the computational simulation uses an internal residual stress model for the part that uses calibrated values for both a coefficient of thermal expansion and an elastic modulus of the at least one material, in at least one direction, for at least thermal stress due to cooling and pressure compensation during and/or after a packing phase of the injection molding process, in accordance with the measured shrinkage data for the at least one material; and providing the amount of warpage predicted for the part manufactured using the mold.

One or more aspects of the subject matter described in this specification can be embodied in one or more methods (and also one or more non-transitory computer-readable mediums tangibly encoding a computer program operable to cause data processing apparatus to perform operations) that include obtaining, by a numerical injection molding simulation program, a three-dimensional model of a mold and measured shrinkage data for at least one material; predicting, by the numerical injection molding simulation program, an amount of warpage for a part manufactured using the mold by computational simulation of an injection molding process, wherein the computational simulation uses an internal residual stress model for the part that uses calibrated values for a coefficient of thermal expansion and for a Poisson's ratio of the at least one material, in at least one direction, for at least thermal stress due to cooling and pressure compensation during a packing or holding phase of the injection molding process, in accordance with the measured shrinkage data for the at least one material; and providing the amount of warpage predicted for the part manufactured using the mold.

One or more aspects of the subject matter described in this specification can be embodied in one or more systems including: a data processing apparatus including at least one hardware processor; and a non-transitory computer-readable medium encoding instructions configured to cause the data processing apparatus to perform operations that include obtaining, by a numerical injection molding simulation program, a three-dimensional model of a mold and measured shrinkage data for at least one material; predicting, by the numerical injection molding simulation program, an amount of warpage for a part manufactured using the mold by computational simulation of an injection molding process, wherein the computational simulation uses an internal residual stress model for the part that uses calibrated values for a coefficient of thermal expansion and for a Poisson's ratio of the at least one material, in at least one direction, for at least thermal stress due to cooling and pressure compensation during a packing or holding phase of the injection molding process, in accordance with the measured shrinkage data for the at least one material; and providing the amount of warpage predicted for the part manufactured using the mold.

Obtaining the measured shrinkage data can include loading the measured shrinkage data for the at least one material, at runtime for the computational simulation, from a database containing data about shrinkage for injection molded test samples, wherein the injection molded test samples have been produced under different molding conditions for the at least one material. The different molding conditions can include different injection velocities, different mold pressure levels, and different polymer melt and mold temperatures used with different part geometries. The at least one material can include different polymer material grades.

The computational simulation can calibrate the coefficient of thermal expansion in both a direction of flow of the at least one material and a direction perpendicular to the direction of flow based on a magnitude of shrinkage measured in each of the direction of flow and the direction perpendicular to the direction of flow, and the computational simulation calibrates the Poison's ratio of the at least one material in both the direction of flow and the direction perpendicular to the direction of flow at a temperature higher than room temperature, based on an observed sensitivity of measured shrinkage, in each of the direction of flow and the direction perpendicular to the direction of flow, due to variations in packing pressure.

The predicting can include finding, in the measured shrinkage data, shrinkage measurements that differ for the at least one material only in packing pressure; determining such a shrinkage measurement case, from the shrinkage measurements, that has a thickness corresponding to a thickness of the at least one material at a location in the three-dimensional model of the mold; estimating, for the shrinkage measurement case, effective parallel and perpendicular compressibilities for the thickness for the at least one material; calculating calibrated parallel and perpendicular Poisson's ratios from the effective parallel and perpendicular compressibilities; calculating calibrated parallel and perpendicular coefficients of thermal expansion from the effective parallel and perpendicular compressibilities; predicting a residual stress at the location using the calibrated parallel and perpendicular Poisson's ratios for the at least one material and the calibrated coefficients of thermal expansion; and using the residual stress at the location in the computational simulation of the injection molding process.

The at least one material can be a fiber reinforced polymer compound, and the computational simulation can calibrate the coefficient of thermal expansion and the Poisson's ratio for a polymer matrix of the fiber reinforced polymer compound. The internal residual stress model for the part can also use calibrated values for an elastic modulus of the at least one material, in at least one direction, for at least thermal stress due to cooling and pressure compensation during a packing phase of the injection molding process, in accordance with the measured shrinkage data for the at least one material. The computational simulation can further calibrate an elastic modulus of the at least one material in both the direction of flow and the direction perpendicular to the direction of flow at a temperature higher than room temperature, based on an observed sensitivity of measured shrinkage, in each of the direction of flow and the direction perpendicular to the direction of flow, due to variations in packing pressure.

The predicting can include: calculating calibrated parallel and perpendicular elastic moduli from the effective parallel and perpendicular compressibilities; predicting the residual stress at the location using the calibrated parallel and perpendicular Poisson's ratios, the calibrated elastic moduli, and the calibrated coefficients of thermal expansion for the at least one material; and using the residual stress at the location in the computational simulation of the injection molding process.

Calculating the calibrated parallel and perpendicular Poisson's ratios and elastic moduli can include performing a numerical optimization to determine the calibrated parallel and perpendicular Poisson's ratios and elastic moduli from the effective parallel and perpendicular compressibilities. The method can further calibrate the elastic modulus for the polymer matrix of the fiber reinforced polymer compound. Calibrating the Poisson's ratio and the elastic modulus for the polymer matrix of the fiber reinforced polymer compound can include performing a numerical optimization to determine the calibrated parallel and perpendicular Poisson's ratios and elastic moduli for the polymer matrix. Performing the numerical optimization can include minimizing an objective function. The objective function can include a residual function determined from a numerical calculation of parallel and perpendicular fiber reinforced polymer compound compressibilities and coefficients of thermal expansion from calibrated parallel and perpendicular Poisson's ratios and elastic moduli for the polymer matrix using an empirical equation that estimates a fiber orientation based on the thickness. The objective function can include a penalty function that measures a deviation of the calibrated parallel and perpendicular Poisson's ratios and elastic moduli for the polymer matrix from default parallel and perpendicular Poisson's ratios and elastic moduli for the polymer matrix.

The three-dimensional model of the mold can define cooling lines integrated into the mold and can include a three-dimensional model of both a cavity of the mold and a core of the mold. The numerical injection molding simulation program can be part of a numerical structural modelling program.

The providing can include presenting the amount of warpage predicted for the part on a display device along with an alert that the amount of warpage predicted for the part exceeds a predefined threshold. The providing can include presenting the amount of warpage predicted for the part on a display device along with a suggested change in packing pressure control for the mold during the injection molding process to reduce or eliminate warpage of the part. The providing can include presenting the amount of warpage predicted for the part on a display device along with a suggested change to the three-dimensional model of the mold to reduce or eliminate physical mold prototyping cycles.

Particular embodiments of the subject matter described in this specification can be implemented to realize one or more of the following advantages. Multiple complementary material properties, including a coefficient of thermal expansion, an elastic modulus, and/or the Poisson's ratio are calibrated using shrinkage data for injection molded test samples under different molding conditions. Rather than performing an off-line calibration that is generic and not tailored to the specific characteristics of the geometry and process that is being modelled, the calibration can be performed at runtime during a computational simulation of an injection molding process, and the calibration of the material properties can be uniquely adapted to the conditions of the specific part that is being modelled. Rather than performing an off-line calibration that may require a significant amount of computation, the runtime calibration can be performed more efficiently and saves computation time. Accuracy of a prediction of a part manufactured using the injection molding process can be improved because the computational simulation uses the calibrated values for the coefficient of thermal expansion, the elastic modulus, and/or the Poisson's ratio of a material. In particular, an amount of warpage, e.g., distortion caused by internal residual stress resulting from shrinkage, can be more accurately predicted because the calibrated elastic modulus and/or Poisson's ratio at elevated temperatures can be used to modify an amount of shrinkage of the manufactured part with respect to the compensating effect of packaging pressure induced during and/or after the packing phase of the injection molding process. Rather than limiting to non-fiber reinforced polymer materials, the warp prediction can be applied to a fiber reinforced polymer compound and the computational simulation can calibrate the coefficient of thermal expansion and the elastic modulus and/or Poisson's ratio for a polymer matrix of the fiber reinforced polymer compound. The more accurate prediction of warpage can be used to suggest a change to a three-dimensional model of a mold (e.g., a cooling mold) to reduce or eliminate the number of physical mold prototyping cycles required to achieve final manufactured part dimensions which are within design tolerances.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
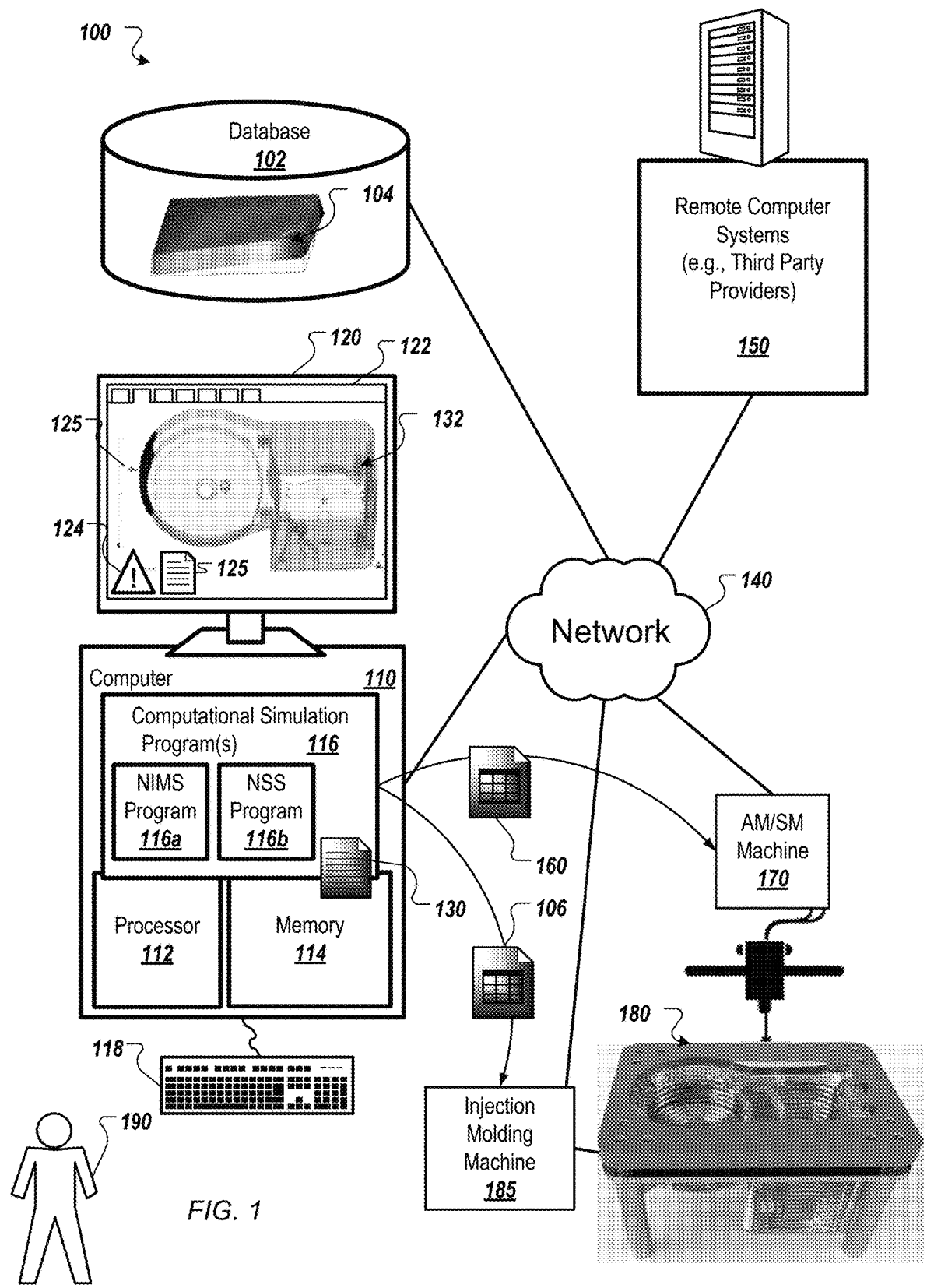
FIG. 1 shows an example of a system usable to perform warp prediction in injection molding.

FIG. 1 shows an example of a system 100 usable to perform warp prediction in injection molding. The "injection molding" as used in this application includes producing parts by injecting molten material into a mold, as well as overmolding, compression molding, compression-injection molding and insert molding manufacturing processes.

A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs include one or more 3D modeling and simulation programs such as a computational simulation program 116, which can run locally on computer 110, remotely on a computer of one or more remote computer systems 150 (e.g., one or more third party providers' one or more server systems accessible by the computer 110 via the network 140) or both locally and remotely. The computational simulation program 116 presents a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer.

A user 190 can interact with the one or more 3D modeling and simulation programs to create and/or load a 3D model of a mold for an injection molding application. For example, the 3D model of the mold can be loaded from non-volatile memory or storage of the computer 110, can be received from another computer program, or can be designed in the current 3D modeling and simulation program 116. This can be done using known graphical user interface tools. The 3D model can be defined in the computer using various known 3D modeling formats, such as using solid models (e.g., voxels) or surface models (e.g., B-Rep (Boundary Representation), surface meshes, etc.). In some implementations, the 3D model can include computer generated models of the mold in three dimensions that are stored in the computer 110 as two-dimensional (2D) based model representations of the part, e.g., a shell model.

In some implementations, the user 190 can interact with the one or more 3D modeling and simulation programs 116 to create and/or load a 3D model of a mold that can be used to simulate the packing phase of the injection molding application.

In some implementations, the one or more 3D modeling and simulation programs 116 include a numerical injection molding simulation (NEVIS) program 116a, e.g., Moldflow® software, available from Autodesk, Inc., of San Francisco, California, or Sigmasoft® software, available from SIGMA Plastic Services, Inc., of Schaumburg, Illinois, or Moldex3D® software, available from Coretech Systems Co., Ltd., of Taiwan. The NIMS program 116a can be a standalone software application, or be integrated with another software application, such as a computer aided design (CAD) program 116. The user 190 or a program component of the system 100 can operate the NIMS program 116a to simulate an injection molding process (e.g., thermoset or thermoplastic polymer injection molding, including those used with a high mold temperature or heated molds) using the 3D model of the mold and generate data that represents how the injected material is likely to flow inside the mold, the resulting temperatures and pressures that will likely be produced inside the mold, as well as an amount of warpage (e.g., shrinkage and distortion) for the part due to cooling and pressure compensation during and/or after a packing phase of the injection molding process. In some implementations, when the 3D model is stored in the computer 110 as two-dimensional (2D) based model representations of the part, e.g., a shell model, the one or more 3D modeling and simulation programs can employ a shell-based simulation.

In some implementations, the one or more 3D modeling and simulation programs 116 include a numerical structural simulation (NSS) program 116b, e.g., a computer aided design (CAD) program, a computer aided engineering (CAE) program, a computer aided manufacturing (CAM) program, or a process planning program. Examples of a NSS program 116b include Netfabb® or FUSION360™ software, available from Autodesk, Inc., of San Francisco, California, or OptiStruct software, available from Altair Engineering, Inc., of Troy, Michigan, or Betatype software, available from Betatype Ltd. at www.betaty.pe. In some implementations, the NIMS program 116a can be part of the NSS program 116b. The NSS program 116b can be a standalone software application, or be integrated with another software application, such as CAD program 116. The user 190 or a program component of the system 100 can operate the NSS program 116b to simulate (using the 3D model data) the structural performance of the molded part and to modify the structure design of the mold and/or the part so as to avoid stress and buckling failures.

For example, as shown in FIG. 1, a representation 132 of a 3D model of a mold for a part of a blender (which is but one example of many possible parts) is displayed in the UI 122. Using the amount of warpage predicted by the computational simulation program 116, cooling lines can be added to the 3D model of the mold, moved within the 3D model of the mold, or both, such that the amount of warpage predicted is within a predefined threshold. In addition, the simulation can be repeated with the cooling lines included in the 3D model to generate updated temperature and pressure data, and the 3D model can be redesigned as needed to improve cooling performance (e.g., by adjusting the number and locations of the cooling lines within the 3D model) and generate a complete 3D model of a mold.

The NIMS program 116a can obtain (i) the 3D model of the mold and (ii) measured shrinkage data for the material that is being used in an injection molding of the part. For example, the 3D model of the mold can be a 3D model of the mold that is previously designed for this injection molding process, such as the 3D model 132. The 3D model of the mold can be stored as a document 130 and/or used to generate another representation of the model (e.g., a .STL file for additive manufacturing). Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

The NIMS program 116a can also obtain measured shrinkage data for the material that is being used in an injection molding of the part. The measured shrinkage data can include data about shrinkage for injection molded test samples that have been produced under different molding conditions for a plurality of materials. The different molding conditions can include different injection velocities, different mold pressure levels, and different polymer melt and mold temperatures used with different part geometries.

The NIMS program 116a can load the measured shrinkage data for the material, at runtime for the computational simulation, from a database 102 containing data about shrinkage for injection molded test samples. Instead of requiring an off-line calibration procedure to be performed in advance, the NIMS program 116a can load the measured shrinkage data for the material and perform calibration of material properties (e.g., a coefficient of thermal expansion, an elastic modulus, and/or a Poisson's ratio) at runtime for the computational simulation.

For example, the database 102 can store data about shrinkage for injection molded test samples. The test samples can have a simple (regular) shape. The representation of a test sample 104 (e.g., a simple regular shape of a particular kind of material) shows an amount of warpage for the test sample manufactured using an injection molding process. In particular, the representation of the test sample 104 shows measured shrinkage data for the injection molded test sample under a particular injection molding condition. The database 102 can include many test samples that have been produced under different molding conditions for a plurality of materials. The computational simulation program 116 (e.g., the NIMS program 116a) can load the shrinkage data for the test samples (e.g., shrinkage data for the test sample 104) from the database 102. For example, the computational simulation program 116 can obtain the shrinkage data for the test samples via the network 140. As another example, the database 102 can be located at the computer 110, and the computational simulation program 116 can directly access the database 102.

The NIMS program 116a can predict an amount of warpage for the part manufactured using the mold by computational simulation of the injection molding process. The computational simulation uses an internal residual stress model for the part that uses calibrated values for a coefficient of thermal expansion, an elastic modulus, and/or a Poisson's ratio of the material in at least one direction. The amount of warpage predicted for the part is calculated based on the thermal stress due to cooling and pressure compensation during and/or after a packing phase of the injection molding process, in accordance with the measured shrinkage data for the material. For example, the computer 110 can show shrinkage and distortion of the part predicted by the computational simulation for injection molding in accordance with the 3D model 132 of the mold.

The amount of warpage predicted for the part can be presented on the display device 120 in the UI 122. In some implementations, the UI 122 can further display an alert 124 that the amount of warpage predicted for the part exceeds a predefined threshold. In some implementations, the computational simulation program 116 can calculate a suggested change 125 in packing pressure control for the mold during the injection molding process to reduce or eliminate warpage of the part and the UI 122 can display a suggested change in the packing pressure control. In some implementations, the computational simulation program 116 can calculate the suggested change 125 to the 3D model of the mold to reduce or eliminate physical mold prototyping cycles, and the UI 122 can display the suggested change 125 to the 3D model of the mold.

After reviewing the amount of warpage predicted for the part, the user 190 can determine whether the amount of warpage predicted is acceptable. If the amount of warpage predicted for the part exceeds a predefined threshold, the user may make a change in the packing pressure control, or may make a change to the 3D model 132 of the mold. In some implementations, after the 3D model of the mold is determined, the 3D model can be used to manufacture a mold 180, e.g., by an additive manufacturing process using a manufacturing machine 170. For example, the one or more 3D modeling and simulation programs (e.g., computational simulation program 116) can create a digital representation of the 3D model 132 of the mold, and provide a document 160 (of an appropriate format) to the manufacturing machine 170 to create the mold 180. Document 160 can include controlling instructions to operate the machine to create the mold 180. The manufacturing machine 170 can employ one or more additive manufacturing techniques, such as granular techniques (e.g., Selective Laser Sintering (SLS) and Direct Metal Laser Sintering (DMLS)), extrusion techniques (e.g., Fused Deposition Modelling (FDM)), or subtractive or any other computer aided manufacturing methods. In addition, the user 190 can save or transmit the 3D model of the new mold for later use. For example, the computational simulation program 116 can store the document 130 that includes the 3D model of the mold.

Once the user determines the amount of warpage predicted is acceptable, e.g., if the amount of warpage predicted for the part does not exceed a predefined threshold, the user can use an injection molding machine 185 to manufacture the part using an injection molding process, including using a mold 180 manufactured using the 3D model 132 of the mold and using the proper packing pressure control that has been previously determined in the computational simulation. The injection molding machine 185 can be directly connected to the computer 110, or can be connected via a network 140, as shown in FIG. 1.

The one or more 3D modeling and simulation programs (e.g., the computational simulation program 116) can create a digital representation of the 3D model of the part representing an amount of warpage predicted for the part manufactured using an injection molding process. The one or more 3D modeling and simulation programs (e.g., the computational simulation program 116) can generate appropriate parameters (e.g., an appropriate level of packing pressure) for the injection molding process and can provide a document 106 (of an appropriate format) to the injection molding machine 185, where the document 106 includes the appropriate parameters for the injection molding process to be performed using the injection molding machine 185.

The injection molding machine 185 can employ one or more injection molding techniques to manufacture the part. In addition, the user 190 can save or transmit the appropriate parameters for the injection molding process for later use. For example, the computational simulation program 116 can store a document 130 that includes the appropriate parameters for the injection molding process.

Figure 2:
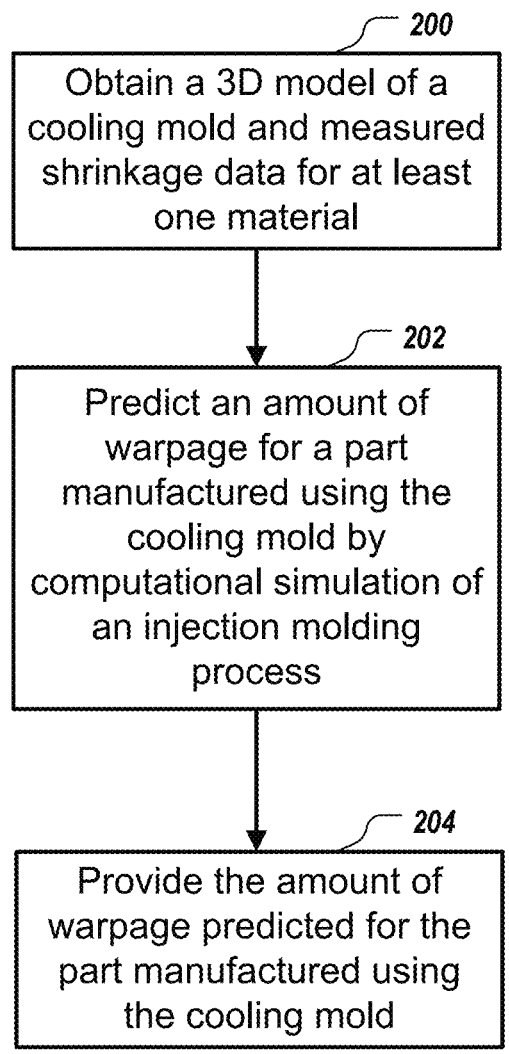
FIG. 2 shows an example of a process to perform warp prediction in injection molding.

FIG. 2 shows an example of a process (e.g., performed by program(s) 116) to perform warp prediction in injection molding. A 3D model of a mold (e.g., a cooling mold) and measured shrinkage data for at least one material is obtained 200 by a numerical injection molding simulation program. The injection molding as used in this application includes producing parts by injecting molten material into a mold. In some implementations, the injection molding as used in this application also includes overmolding and insert molding manufacturing processes. In some implementations, the 3D model of the mold can be a 2D representation of the mold, e.g., a shell model of the mold and the computational simulation can be a shell-based simulation.

An amount of warpage for a part manufactured using the mold is predicted 202 by computational simulation of an injection molding process. This prediction can be performed by the numerical injection molding simulation program at runtime during the simulation of the injection molding process. The warpage for a part includes shrinkage, distortion, and/or warping of the part that results from cooling during and/or after the packing phase of the injection molding process after filling the mold cavity. During the packing phase, additional material, e.g., polymer melt, can be forced into the cavity under high pressure to compensate for the anticipated thermal shrinkage.

The computational simulation 202 uses an internal residual stress model for the part that uses calibrated values for a coefficient of thermal expansion (CTE), an elastic modulus, and/or a Poisson's ratio of the at least one material, in at least one direction. The calibrated values for a coefficient of thermal expansion, an elastic modulus, and/or a Poisson's ratio of the at least one material accounts for at least thermal stress due to cooling and pressure compensation during and/or after a packing phase of the injection molding process, in accordance with the measured shrinkage data for the at least one material. For example, the calibrated CTE of the material can account for the thermal stress due to cooling, and the calibrated elastic modulus and/or calibrated Poisson's ratio can be used to determine the effect of the compensating packing pressure.

In some implementations, obtaining the measured shrinkage data can include loading the measured shrinkage data for the at least one material, at runtime for the computational simulation, from a database containing data about shrinkage for injection molded test samples. The injection molded test samples can be produced under different molding conditions for the at least one material. The different molding conditions can include different injection velocities, different mold pressure levels, and different polymer melt and mold temperatures used with different part geometries. The test samples can have a simple (regular) shape. The runtime calibration process allows the calibration to be performed using the test samples manufactured at conditions most similar to the manufacturing conditions of the geometry and process being simulated. Therefore, the runtime calibration process can accurately and efficiently predict the internal residual stress resulting from shrinkage.

In order to predict the final part shape and dimensions, an accurate prediction of the resulting residual stress is used. The residual stress is the balance of thermal stress (e.g., shrinkage) and packing pressure (e.g., shrinkage compensation), both of which are non-uniform throughout the molded part. Packing pressure is a dynamic process control parameter set by an operator of an injection molding machine.

In some implementations, the computational simulation 202 can calibrate the coefficient of thermal expansion in both a direction of flow of the at least one material and a direction perpendicular to the direction of flow based on a magnitude of shrinkage measured in each of the direction of flow and the direction perpendicular to the direction of flow. For example, the coefficient of thermal expansion in each direction can be calibrated based on the magnitude of shrinkages measured in each direction in the injection molded test samples.

In some implementations, the computational simulation 202 can calibrate the elastic modulus, and/or the Poisson's ratio of the at least one material in both the direction of flow and the direction perpendicular to the direction of flow at an elevated temperature based on an observed sensitivity of measured shrinkage, in each of the direction of flow and the direction perpendicular to the direction of flow, due to variations in packing pressure. Here, the elevated temperature is the temperature of the material, e.g., the polymer, while cooling in the mold. This temperature is higher than the ambient room temperature. While standard laboratory measurement of elastic modulus and Poisson's ratio are often measured at room temperature, the calibrated elastic modulus and the calibrated Poisson's ratio are an effective modulus and an effective Poisson's ratio of the solidified material as it cools from its elevated solidification temperature to room temperature.

Figure 3:
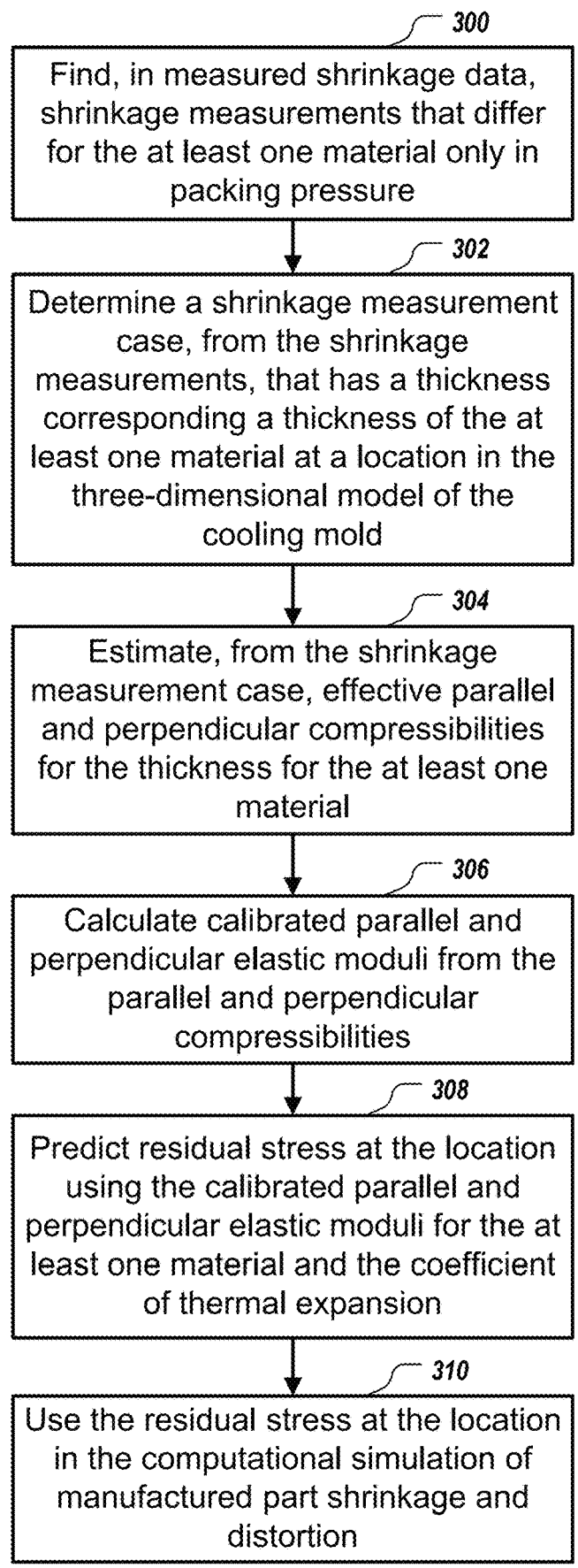
FIG. 3 shows an example of a process to calculate a shrinkage amount due to variations in packing pressure.

FIG. 3 shows an example of a process (e.g., performed by program(s) 116) to calculate a shrinkage amount using calibrated elastic moduli determined according to variations in measured shrinkage values due to variations in packing pressure. The process of FIG. 3 is an example of prediction 202 from FIG. 2.

In the measured shrinkage data, shrinkage measurements (e.g., pairs of shrinkage measurements or a series of three or more shrinkage measurements) that differ for the at least one material only in packing pressure can be found 300. A shrinkage measurement case that has a thickness corresponding to a thickness of the at least one material at a location in the three-dimensional model of the mold (e.g., a cooling mold) can be determined 302 from the shrinkage measurements. In some implementations, the shrinkage measurement case with similar thickness can be determined 302 using linear interpolation. For example, if neither a first thickness having a first shrinkage measurement, nor a second thickness having a second shrinkage measurement is sufficiently close to the part thickness at a location in the three-dimensional model of the mold, the system can generate a third shrinkage measurement by interpolating 302 between the first and second shrinkage measurements to estimate a third shrinkage measurement at a thickness similar to the thickness of the at least one material at the location in the three-dimensional model of the mold.

Effective parallel and perpendicular compressibilities for the thickness for the at least one material can be estimated 304. The compressibilities are the observed response of the material to hydrostatic stress loads, and can be determined from the variation in measured shrinkage in test samples having the same thickness but produced at different packing pressure settings on the injection molding machine (or at different compression pressure settings on a compression molding machine, e.g., different press force settings). The effective compressibilities can be used to calibrate effective elastic moduli and/or Poisson's ratios of the material.

For example, for each test sample, the amounts of parallel and perpendicular shrinkage can be estimated using the following analytical formula:

$$\text{Shrinkage} = CTE*(T_{sol}-T_{room}) - Kp(PT,th)*p_{pack}*\text{compressibility} \qquad (1)$$

Here, $p_{pack}$ is the packing pressure of the test sample. $T_{sol}$ is the solidification temperature of the material. $T_{room}$ is the ambient room temperature, being the temperature of the molded test samples at the time that their shrinkage was measured. PT (PackingTime) is the duration of the application of the packing pressure control parameter as the test samples are cooling in the mold. $K_p$ is an empirical packing pressure transmission efficiency function which varies depending on PackingTime and test sample thickness (th); it represents how effectively the applied packing pressure can be transmitted to the polymer cooling in the mold cavity. In other words, $K_p$ represents the degree of compensation for thermal shrinkage which occurs in the cavity for each unit of packing pressure applied by a molding machine. The $K_p$ function can be heuristically determined to characterize the efficiency of the mold gating and polymer feed system in the mold of the test samples to transmit the packing pressure applied by the molding machine to the polymer in the mold cavity during the molding of the test samples. $K_p$ can be a function of the duration of the packing phase and of the length and thickness of the flow path (feed system channels and cavity) from the molding machine's injection unit to the cavity and of the duration of the packing phase, e.g., narrow gates and thin test samples which freeze quickly will reduce the transmission effectiveness of the applied packing pressure. $K_p$ can also be influenced by the flowability and compressibility of the material. In some implementations, $K_p$ can be defined in a range between 0 and 1. CTE is the Coefficient of Thermal Expansion, which can be different in each direction and is to be determined by calibration using the measured shrinkage values of the test samples in each direction. The CTE is multiplied by the temperature interval of cooling from the solidification temperature to the room temperature (the temperature at which the shrinkage of the test samples is measured). Compressibility, which can be different in each direction can also be determined by calibration using the measured shrinkage values of the test samples in each direction. The compressibilities represent the response of the measured shrinkage in each direction to the hydrostatic packing pressure.

Equation 1 expresses the concept that the shrinkage which is measured in the test samples is comprised of the thermal shrinkage (CTE multiplied by the temperature decrease) minus an estimate of the shrinkage compensation achieved by the packing pressure. This estimate of the shrinkage compensation is the product of the packing pressure multiplied by the compressibility and $K_p$. It is important to note that in this equation there are two parameters which are to be calibrated: the CTE and the compressibility. Using a series of shrinkage measurements that differ only by the packing pressure, the compressibility can be calibrated using linear regression analysis. Other suitable approaches to calibrating the compressibility can be used in various implementations.

Using the measured shrinkage variation among the test samples molded at different packing pressure in parallel or perpendicular directions, the computational simulation program can calculate the effective parallel and perpendicular compressibilities for the thickness and for the material. Once the compressibilities have been determined in this way, those compressibilities are then used in Equation 1 to complete the calibration of the CTE.

Parallel and perpendicular elastic moduli can be calculated 306 using the effective parallel and perpendicular compressibilities. For example, the calibrated compressibilities in parallel and perpendicular directions can be used in combination with laboratory measured Poisson's ratios to calculate calibrated parallel and perpendicular elastic moduli according to known, physics-based estimates of linear material behavior. Thus, the shrinkage amount can be predicted for the part that is being simulated by the computational simulation program. For example, based on the calibrated CTE and the calibrated parallel and perpendicular elastic moduli, the residual stress can be estimated at different locations of the 3d model of the part manufactured in the mold.

Residual stress at each location of the three-dimensional model of the mold can be predicted 308 using the calibrated parallel and perpendicular elastic moduli for the at least one material and the calibrated coefficient of thermal expansion. Thus, the residual stress can be predicted for the part that is being simulated by the computational simulation program. For example, based on the calibrated CTE and the calibrated parallel and perpendicular elastic moduli, the residual stress can be estimated at different locations of the part to be molded based on the predicted transmission of packing pressure transmitted to that location. Note that Equation 1 and the linear regression analysis, with the use of the heuristic $K_p$ and the packing pressure control parameter, are used with the shrinkage measured in the test samples to determine the calibrated compressibility, elastic modulus and CTE. Whereas in the NIMS computation of the injection molding of the three-dimensional model of the mold, the pressure transmission of the process control packing pressure into each location of the mold cavity is calculated according to the specific geometry, viscosity, shear rate, pressure, temperature and frozen layer thickness of the polymer as it flows and cools in the cavity of the mold and through the gating and feed system of the mold, in the normal way of the particular NIMS program.

The calculated residual stress at the location can be used 310 in the computational simulation of manufactured part shrinkage and distortion. The calculated residual stresses at various locations in the three-dimensional model of the part represent the net compensating effect of the packing pressure to compensate for the thermal stress induced during cooling. For example, the calibrated CTE can be used to predict the magnitude of the thermal shrinkage due to cooling. The calibrated elastic modulus can be used to determine the magnitude of the shrinkage compensation achieved by the packing pressure.

Figure 4:
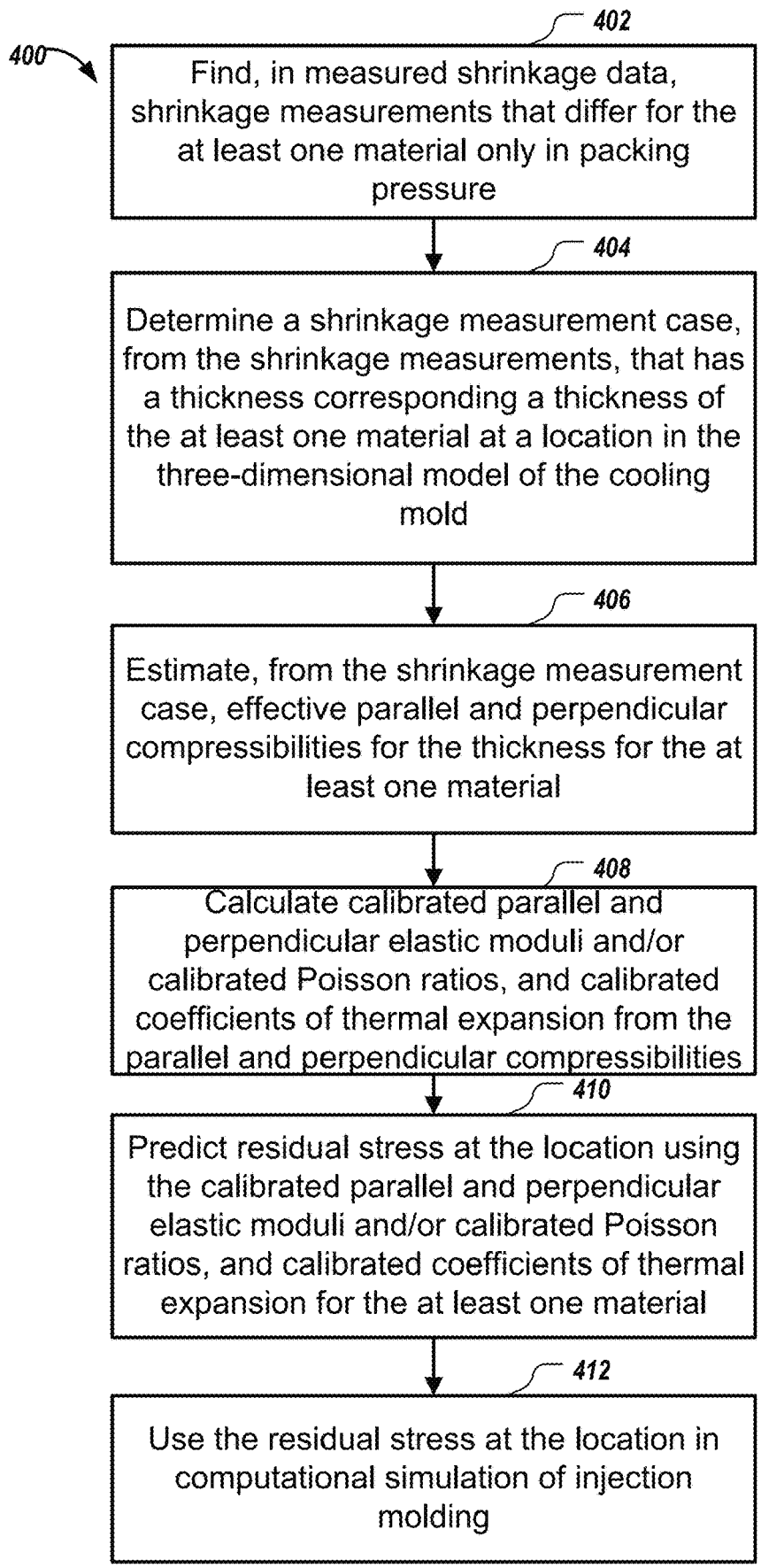
FIG. 4 shows another example of a process to calculate a shrinkage amount due to variations in packing pressure.

FIG. 4 shows another example of a process 400 (e.g., performed by program(s) 116) to calculate a shrinkage amount using calibrated elastic modulus and/or Poisson's ratio determined according to variations in measured shrinkage values due to variations in packing pressure. In the measured shrinkage data, shrinkage measurements that differ for the at least one material only in packing pressure can be found 402. For example, a plurality of experimental shrinkage measurements for different processing conditions can be downloaded from the database 102. A series of shrinkage measurements that differ in the packing pressure but have similar processing conditions, for example have similar melt and mold pressure, injection speed, cooling time and geometry of the mold (e.g., thickness), can be found by searching the downloaded data. A shrinkage measurement case that has a thickness corresponding to a thickness of the at least one material at a location in the three-dimensional model of the mold (e.g., a cooling mold) can be determined 404 from the shrinkage measurements. In some implementations, the shrinkage measurement case with similar thickness can be determined 404 using linear interpolation.

A number of those series of shrinkage measurements can be selected. For each of those series, i, an average packing pressure over the Ni measurements of the series i can be calculated as $\bar{p}_i = 1/N_i \Sigma_{j=1}^{N_i} p_{i,j}$ where $p_{i,j}$ is the packing pressure for the j-th measurement in the series i. An average shrinkage in the direction parallel to the polymer flow $\overline{S^\|}_i = 1/N_i \Sigma_{j=1}^{N_i} S^\|_{i,j}$ and in the direction perpendicular to the flow $\overline{S^\perp}_i = 1/N_i \Sigma_{j=1}^{N_i} S^\perp_{i,j}$ can also be calculated, where $S^\|_{i,j}$ and $S^\perp_{i,j}$ are measured shrinkages in the parallel and perpendicular shrinkages respectively for the j-th measurement in the series i.

Then, for each series, i, average linear compressibility in a direction parallel to the direction of the flow, $\overline{C^\|}_i$ and in a direction perpendicular to the direction of the flow, $\overline{C^\perp}_i$ can be calculated as:

$$\overline{C^\|}_i = \frac{\sum_{j=1}^{N_i} \left(S^\|_{i,j} - \overline{S^\|_i}\right) * (p_{i,j} - \overline{p_i})}{\sum_{j=1}^{N_i} (p_{i,j} - \overline{p_i})^2}$$

-continued $$\overline{C^\perp}_i = \frac{\sum_{j=1}^{N_i} \left(S^\perp_{i,j} - \overline{S^\perp_i}\right) * (p_{i,j} - \overline{p_i})}{\sum_{j=1}^{N_i} (p_{i,j} - \overline{p_i})^2}$$

Then, the average compressibilities $\overline{C^\|}$ and $\overline{C^\perp}$ over all the series can be calculated 406. In some examples, series that show poor correlation between packing pressure and the shrinkage can be ignored when calculating the averages. In some examples, series that have processing conditions significantly different from the processing conditions of the part to be analyzed can alternatively or additionally be ignored. In some examples, a weighted average can be used, such that series that have processing conditions significantly different from the processing conditions of the part to be analyzed contribute with a lower weight to the average. In some implementations, the weights can be proportional to the inverse of a relative distance between the series processing conditions and the simulation processing conditions of the part to be analyzed. For example, a distance between the series processing conditions and the simulation processing conditions of the part to be analyzed can be calculated as a sum of squares of differences between the values of one or more series processing conditions and the values of the corresponding one or more simulation processing conditions, optionally divided by the variation of each respective series processing condition, i.e., a difference between a maximum and a minimum value of each respective series processing condition.

The mechanical properties of the material can be described using a material model. For example, the mechanical properties of the material can be described using an orthotropic anisotropic model with nine parameters, i.e., three elastic moduli $E_{11}$, $E_{22}$, $E_{33}$, three Poisson's ratios, $v_{12}$, $v_{23}$, $v_{31}$, and three shear moduli $G_{12}$, $G_{32}$, $G_{31}$. In some implementations, the mechanical properties can be described using a transversely isotropic model with five parameters, namely, two elastic moduli ($E_1$, $E_2$), two Poisson's ratios ($v_{12}$, $v_{23}$), and one shear modulus ($G_{12}$). For the transversely isotropic model, the linear compressibility in the flow direction and in a direction perpendicular to the direction of the flow are:

$$C^\| = \frac{1 - 2v_{12}}{E_1}$$

$$C^\perp = \frac{1 - v_{23}}{E_2} - \frac{v_{12}}{E_1}$$

$E_1$ is the elastic modulus in the flow direction, $E_2$ is the elastic modulus in a direction perpendicular to the flow, $v_{12}$ is the Poisson's ratio for a plane which contains the flow direction and $v_{23}$ is the Poisson's Ratio for a plane perpendicular to the flow direction. Measured mechanical properties can be obtained from the material database and their values can be adjusted 408 using the average compressibilities.

In some examples, if data for the shrinkage in thickness direction $S^{th}_{i,j}$ is available in the database, the average compressibility in the thickness direction (i.e., in a direction parallel to the normal of the part surface) can also be calculated in a similar manner. The compressibility in the thickness direction can be used to adjust mechanical properties (e.g., elastic modulus and/or Poisson ratio) in the thickness direction.

In an example, the elastic moduli in the flow direction and in a direction perpendicular to the flow are adjusted 408 using the transversely isotropic model to obtain adjusted values $E_1^{Corr}$ and $E_2^{Corr}$ using measured values for the Poisson ratio from the material database:

$$E_1^{Corr} = \frac{1 - 2v_{12}}{\overline{C^{II}}}$$

$$E_2^{Corr} = \frac{1 - v_{23}}{\overline{C^{\perp}} + v_{12}/E_1^{Corr}}$$

In another example, the Poisson's ratios are adjusted 408 to obtain adjusted values $v_{12}^{Corr}$ and $v_{23}^{Corr}$ using measured values for the elastic moduli from the material database:

$$v_{12}^{Corr} = 0.5 * \left(1 - E_1 * \overline{C^{II}}\right)$$

$$v_{23}^{Corr} = 1 - \left(\overline{C^{\perp}} E_2 + v_{12}^{Corr} \frac{E_1}{E_2}\right)$$

In another example, four mechanical properties, i.e., the two Poisson's ratios and the two elastic moduli are adjusted 408 by numerical minimization of an objective function $K(E_1^{Corr}, E_2^{Corr}, v_{12}^{Corr}, v_{23}^{Corr})$ using an optimization algorithm. In some implementations, the shear modulus can also be adjusted in the minimization.

For example, a penalty method can be used to perform numerical minimization. For example, the optimization function $K(E_1^{Corr}, E_2^{Corr}, v_{12}^{Corr}, v_{23}^{Corr})$ can be a sum of a residual term $R(E_1^{Corr}, E_2^{Corr}, v_{12}^{Corr}, v_{23}^{Corr})$ and a penalty function $F(E_1^{Corr}, E_2^{Corr}, v_{12}^{Corr}, v_{23}^{Corr})$, $K(E_1^{Corr}, E_2^{Corr}, v_{12}^{Corr}, v_{23}^{Corr}) = R(E_1^{Corr}, E_2^{Corr}, v_{12}^{Corr}, v_{23}^{Corr}) + F(E_1^{Corr}, E_2^{Corr}, v_{12}^{Corr}, v_{23}^{Corr})$.

For example, the residual term R can be a sum of squared differences $$R(E_1^{Corr}, E_2^{Corr}, v_{12}^{Corr}, v_{23}^{Corr}) =$$

$$\left(\overline{C^{II}} - \frac{1 - 2v_{12}^{Corr}}{E_1^{Corr}}\right)^2 + \left(\overline{C^{\perp}} - \frac{1 - v_{23}^{Corr}}{E_2^{Corr}} + \frac{v_{12}^{Corr}}{E_1^{Corr}}\right)^2$$

The penalty function F penalizes deviations of the mechanical parameters from the measured database values, $$F(E_1^{Corr}, E_2^{Corr}, v_{12}^{Corr}, v_{23}^{Corr}) = w_1(E_1^{Corr} - E_1)^2 + w_2(E_2^{Corr} - E_2)^2 + w_3(v_{12}^{Corr} - v_{12})^2 + w_4(v_{23}^{Corr} - v_{23})^2$$

The coefficients $w_1$, $w_2$, $w_3$ and $w_4$ are empirical weighting coefficients. In some implementations, one or more weighting coefficients can be selected based on the mechanical properties of the material. For example, the weights can be selected such that all the addends in the penalty function are approximately of the same order of magnitude. For example, the weights can be selected to be $w_1 = w_2 = \max(E_1, E_2)^2$, and $w_3 = w_4 = 1.0$.

In some implementations, one or more weighting functions can be selected based on an estimated accuracy of the measured mechanical properties, e.g., based on an estimated measurement error of the measured mechanical properties. In some examples, each weighting function can be proportional to the inverse of the square of the estimated measurement error 6 of a respective mechanical property. For example, the weighting functions can be calculated as $w_1 = \delta_{E1}^{-2}$, $w_2 = \delta_{E2}^{-2}$, $w_3 = \delta_{v12}^{-2}$, $w = \delta_{v23}^{-2}$.

After correcting the empirical mechanical properties of the plastic, the thermal expansion coefficients (CTE) $\alpha_k^{\parallel}$ and $\alpha_k^{\perp}$ can be adjusted for each measured processing condition k using the following formulas:

$$\alpha_k^{\parallel} = \frac{S_k^{\parallel} + K_p \overline{C^{II}} p_k}{T_{sol} - T_{room}}$$

$$\alpha_k^{\perp} = \frac{S_k^{\perp} + K_p \overline{C^{\perp}} p_k}{T_{sol} - T_{room}}$$

$S_k^{\parallel}$, $S_k^{\perp}$ are measured shrinkages, $K_p$ is an empirical pressure ratio coefficient that is dependent on the thickness of the sample, $\overline{C^{II}}$ and $\overline{C^{\perp}}$ are calculated average compressibility, $p_k$ is the packing pressure, $T_{sol}$ is the solidification temperature for the material and $T_{room}$ is the ambient temperature.

After all the corrected CTEs for the shrinkage measurement processing conditions are evaluated, corrected CTEs for the part under analysis can be determined using interpolation. For example:

$$\alpha^{\parallel} = \frac{\sum_k w_k \alpha_k^{\parallel}}{\sum_k w_k}$$

$$\alpha^{\perp} = \frac{\sum_k w_k \alpha_k^{\perp}}{\sum_k w_k}$$

The weighting coefficients $w_k$ are dependent on proximity of the experimental processing conditions for the experiment k. In some implementations, a weight $w_k$ can be calculated based on the inverse relative proximity Dk of the experimental processing conditions to the simulation processing condition for the part under analysis as $$w_k = \frac{1}{D_k},$$

with $$D_k = \sum_{l=1}^{N} \left(\frac{p_{l,k} - p_{l,s}}{p_l, \max - p_l, \min}\right)^2,$$

where N is a number of significant processing parameters $p_l$ such as thickness, holding pressure, injection flow rate, melt temperature, etc.; $p_{l,k}$ refers to the value of the parameter $p_l$ for the experimental condition k; refers to the value of the parameter $p_l$ for the simulated processing condition s; $p_l$, max and $p_l$, min refer to the maximal and minimal values of the parameter $p_l$ in the experimental set.

The corrected thermomechanical properties ($E_1^{Corr}$, $E_2^{Corr}$, $v_{12}^{Corr}$, $v_{23}^{Corr}$, $\alpha^{\parallel}$, $\alpha^{\perp}$) can be used in injection molding simulations 410, 412 instead of database values to provide more accurate analysis results.

In some implementations, the at least one material can include different polymer material grades. In some implementations, the at least one material can be a fiber reinforced polymer, and the computational simulation can calibrate the coefficient of thermal expansion, the elastic modulus and Poisson's ratio for a polymer matrix of a fiber reinforced polymer compound. For example, the computational simulation can estimate the properties of the polymer matrix from a combination of measured and estimated properties of the polymer compound based on properties of the reinforcing fibers. The measured properties of the polymer compound can include a Poisson's ratio measured by standard laboratory equipment, e.g., using a tensile testing machine. The estimated properties of the polymer compound can be the calibrated CTE and elastic modulus generated from the measured shrinkage data.

Figure 5:
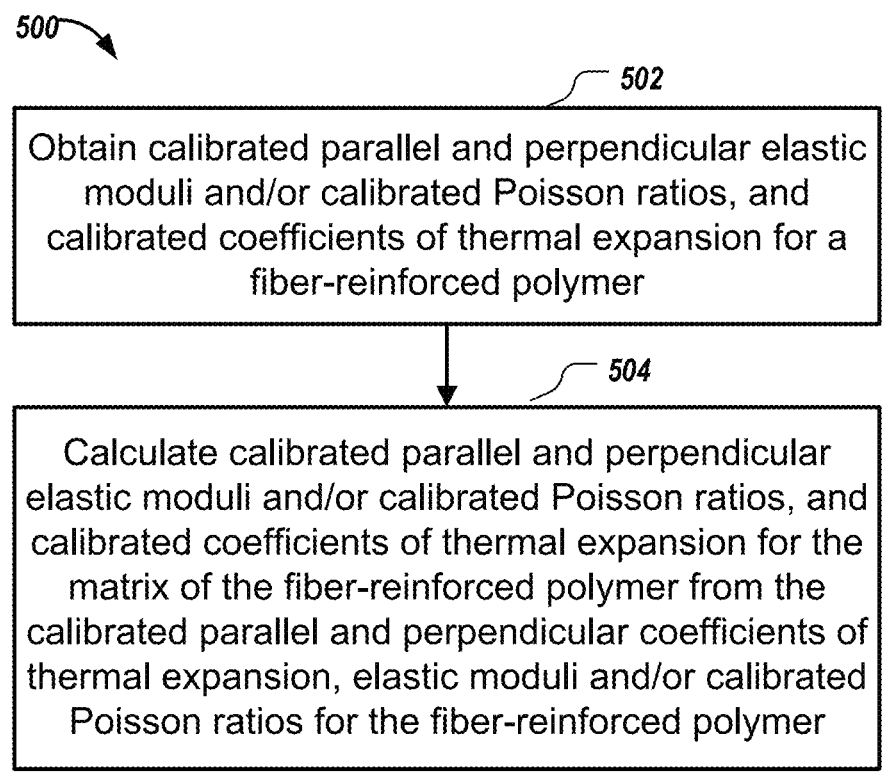
FIG. 5 shows an example of a process to calibrate thermal expansion coefficients, elastic moduli and Poisson's ratio of a matrix of a fiber reinforced polymer compound using calibrated thermal expansion coefficients, elastic moduli and Poisson's ratio of the fiber reinforced polymer.

FIG. 5 shows an example of a process 500 (e.g., performed by program(s) 116) to calibrate thermal expansion coefficients, elastic moduli and/or Poisson's ratio of a matrix of a fiber reinforced polymer compound using calibrated thermal expansion coefficients and calibrated compressibilities or using calibrated thermal expansion coefficients and calibrated elastic moduli and Poisson's ratio of the fiber reinforced polymer.

The process 400 of FIG. 4 can be used to determine linear compressibilities, adjusted mechanical properties of the polymer compound, and corrected thermal expansion coefficients for the polymer compound $\alpha_k^{\parallel}$ and $\alpha_k^{\perp}$ for each measured processing condition k using the same formulas described with respect to FIG. 4. As described with respect to FIG. 4, after all the corrected CTEs for the shrinkage measurement processing conditions are evaluated, corrected CTEs for the part under analysis can be determined using interpolation.

The calculated corrected thermomechanical properties of the composite 502 can be used to evaluate 504 mechanical properties of the polymer matrix, such as CTEs as well as elastic modulus, and/or Poisson's Ratio. In some implementations, both the elastic modulus and the Poisson's ratio of the composite are used to evaluate the elastic modulus and the Poisson's ratio of the polymer matrix.

In some implementations, an isotropic model can be used to describe the mechanical properties of the polymer matrix, such as a single elastic modulus and a Poisson's ratio. In other implementations, a transversely isotropic model with five independent adjustable parameters can be used ($E_1$, $E_2$, $\nu_{12}$, $\nu_{23}$, $G_{12}$) for the matrix.

For example, a numerical minimization of an objective function K with a residual R and a penalty term F can be performed. $E_1$ and $E_2$ are the elastic tensile moduli, $\nu_{12}$ and $\nu_{23}$ are the Poisson's ratios, $G_{12}$ is the shear modulus, and $\alpha_1$ and $\alpha_2$ are the coefficients of thermal expansion (CTE). In this case, $$K(E_1^{Corrmatrix}, E_2^{Corrmatrix}, \nu_{12}^{Corr\_matrix}, \nu_{23}^{Corrmatrix},$$
$$G_{12}^{Corrmatrix}, \alpha_1^{Corrmatrix}, \alpha_2^{Corrmatrix}) = R$$
$$(E_1^{Corrmatrix}, E_2^{Corrmatrix}, \nu_{12}^{Corr\_matrix}, \nu_{23}^{Corrmatrix},$$
$$G_{12}^{Corrmatrix}, \alpha_1^{Corrmatrix}, \alpha_2^{Corrmatrix}) + F$$
$$(E_1^{Corrmatrix}, E_2^{Corrmatrix}, \nu_{12}^{Corr\_matrix}, \nu_{23}^{Corrmatrix},$$
$$G_{12}^{Corrmatrix}, \alpha_1^{Corrmatrix}, \alpha_2^{Corrmatrix})$$

The residual R can be calculated by comparing i) composite material properties (elastic modulus, Poisson's ratio, shear modulus) estimated from compressibilities and CTEs from shrinkage measurement as described above with respect to FIG. 4 and ii) composite material properties (elastic modulus, Poisson's ratio, shear modulus) calculated with a numerical micromechanical calculation from matrix properties that are varied during the optimization process to obtain the best match between the estimated composite properties from i) and from ii).

For example, an empirical equation can be used to estimate fiber orientation from the thickness of a sample $$A_{11} = F_1 + F_2 t$$

$$A_{22} = F_3 + F_4 t$$

$$A_{33} = 1 - A_{11} - A_{22}$$

where $A_{11}$, $A_{22}$, $A_{33}$ are eigenvalues of an average fiber orientation tensor through the thickness of a sample, t is the thickness of the sample, and $F_1 \ldots F_4$ are empirical coefficients that depend on a geometry of the sample.

Using the fiber orientation estimation, the composite properties, i.e., compressibility and CTE can be numerically calculated using a micromechanical model suitable for predicting composite properties with a transversely isotropic polymer matrix model.

The residual R can be determined as a weighted sum of the individual residuals for each CTE and compressibility. In some implementations, the residual R can be calculated by comparing i) composite material properties (compressibilities, CTEs) obtained from shrinkage measurements as described above with respect to FIG. 4 and ii) composite material properties (compressibilities, CTEs) estimated with a numerical micromechanical calculation from the matrix properties that are varied during the optimization properties to obtain the best match between the estimated composite material properties (compressibilities, CTEs) from i) and ii):

$$R(E_1^{Corrmatrix}, E_2^{Corrmatrix}, \nu_{12}^{Corrmatrix}, \nu_{23}^{Corrmatrix},$$
$$G_{12}^{Corrmatrix}, \alpha^{\parallel matrix}, \alpha^{\perp matrix}) = w_1(\overline{C^{\parallel}} - C^{\parallel c})^2 + w_2($$
$$\overline{C^{\perp}} - C^{\perp c})^2 + w_3(\alpha^{\parallel} - \alpha^{\parallel c})^2 + w_4(\alpha^{\perp} - \alpha^{\perp c})^2$$

The coefficients $w_1$, $w_2$, $w_3$, $w_4$ are empirical weighting coefficients. In some implementations, each of the weights can be selected based on the respective estimated values of compressibilities or CTEs for the composite. In some implementations, the weights can be selected based on the variance of the compressibilities or CTEs with respect to experimental database values used for the calibration.

The penalty function F reflects the deviation of the matrix properties that are varied during the optimization process from default values of matrix properties. In some implementations, the default values of the matrix properties can be database values of the matrix properties obtained from a database storing values for matrix properties. In some implementations, the default values of the matrix properties can be calculated from the measured uncalibrated composite properties using a micromechanical model:

$$F(E_1^{Corrmatrix}, E_2^{Corrmatrix}, \nu_{12}^{Corrmatrix}, \nu_{23}^{Corrmatrix},$$
$$G_{12}^{Corrmatrix}, \alpha^{\parallel matrix}, \alpha^{\perp matrix}) = u_1(E_1^{Corrmatrix} -$$
$$E_1^{m,db})^2 + u_2(E_2^{Corrmatrix} - E_2^{m,db})^2 + u_3 -$$
$$(\nu_{12}^{Corrmatrix} - \nu_{12}^{m,db})^2 + u_4(\nu_{23}^{Corrmatrix} -$$
$$\nu_{23}^{m,db})^2 + u_5(G_{12}^{Corrmatrix} - G_{12}^{m,db})^2 + u_6$$
$$(\alpha_1^{Corrmatrix} - \alpha_1^{m,db})^2 + u_7(\alpha_2^{Corrmatrix} - \alpha_2^{m,db})^2$$

The coefficients $u_1 \ldots u_7$ are empirical weighting coefficients. $E_1^{m,db} \ldots \alpha_2^{m,db}$ the default matrix properties obtained from the database or calculated from the measured uncalibrated composite properties. Minimization of the function K by variation of the corrected matrix properties (elastic moduli, Poisson's Ratios, Shear Modulus, CTEs) allows to obtain a set of the matrix properties that is the best match for the calibrated composite properties (compressibilities, CTEs). In some implementations, the weighting coefficients can be selected depending on the values of the composite material properties.

After properties of the polymer matrix are obtained, these properties of the polymer matrix can be used together with reinforcing fiber properties and local predictions of orientation and/or length of the reinforcing fibers in the three-dimensional molded part geometry to obtain CTEs, elastic moduli, and Poisson's ratios of the fiber reinforced polymer compound (e.g., matrix plus fibers) at each location in the molded part geometry. These compound properties can then be used to compute the thermal shrinkage and residual stress after packing pressure compensation. In some implementations, the CTE, Poisson's ratio, and elastic modulus of the compound can be directly obtained at the compound level by applying the effects of local fiber orientation.

In some implementations, the three-dimensional model of the mold can define cooling lines integrated into the mold and can include a three-dimensional model of both a cavity of the mold and a core of the mold. In some implementations, the numerical injection molding simulation program can be part of a numerical structural modelling program.

Referring again to FIG. 2, the amount of warpage predicted for the part manufactured using the mold (e.g., a cooling mold) is provided 204. In some implementations, the system can present 204 the amount of warpage predicted for the part on a display device along with an alert that the amount of warpage predicted for the part exceeds a predefined threshold. The predefined threshold can be a user defined threshold or can be determined in accordance with a process definition included in the program. An example of a program that includes a process definition that determines a predefined threshold include FUSION360™ software, available from Autodesk, Inc., of San Francisco, California. For example, a user of the software (e.g., a design engineer) can specify the acceptable part dimension tolerance and the software can display 204 any areas of the molded part geometry which are predicted to exceed the tolerance values.

In some implementations, the system can present 204 the amount of warpage predicted for the part on a display device along with a suggested change in packing pressure control for the mold during the injection molding process to reduce or eliminate warpage of the part. For example, the computational simulation program can determine an optimized packing pressure control that most optimally balances the predicted thermal shrinkage.

In some implementations, the system can present 204 the amount of warpage predicted for the part on a display device along with a suggested change to the three-dimensional model of the mold to reduce or eliminate physical mold prototyping cycles. An example of a program that generates a suggested change to the 3D model of the mold can include Moldflow® software, available from Autodesk, Inc., of San Francisco, California. For example, a post-processing operation can be performed after warp prediction to propose 204 mold dimension adjustment factors, e.g., a global scaling factor for all three dimensions, or independent scaling factors for each of the three dimensions. The proposed mold dimension adjustment factors can compensate for the predicted dimensional shrinkage and can achieve predicted final part dimensions which closely match the original design dimensions.

Figure 6:
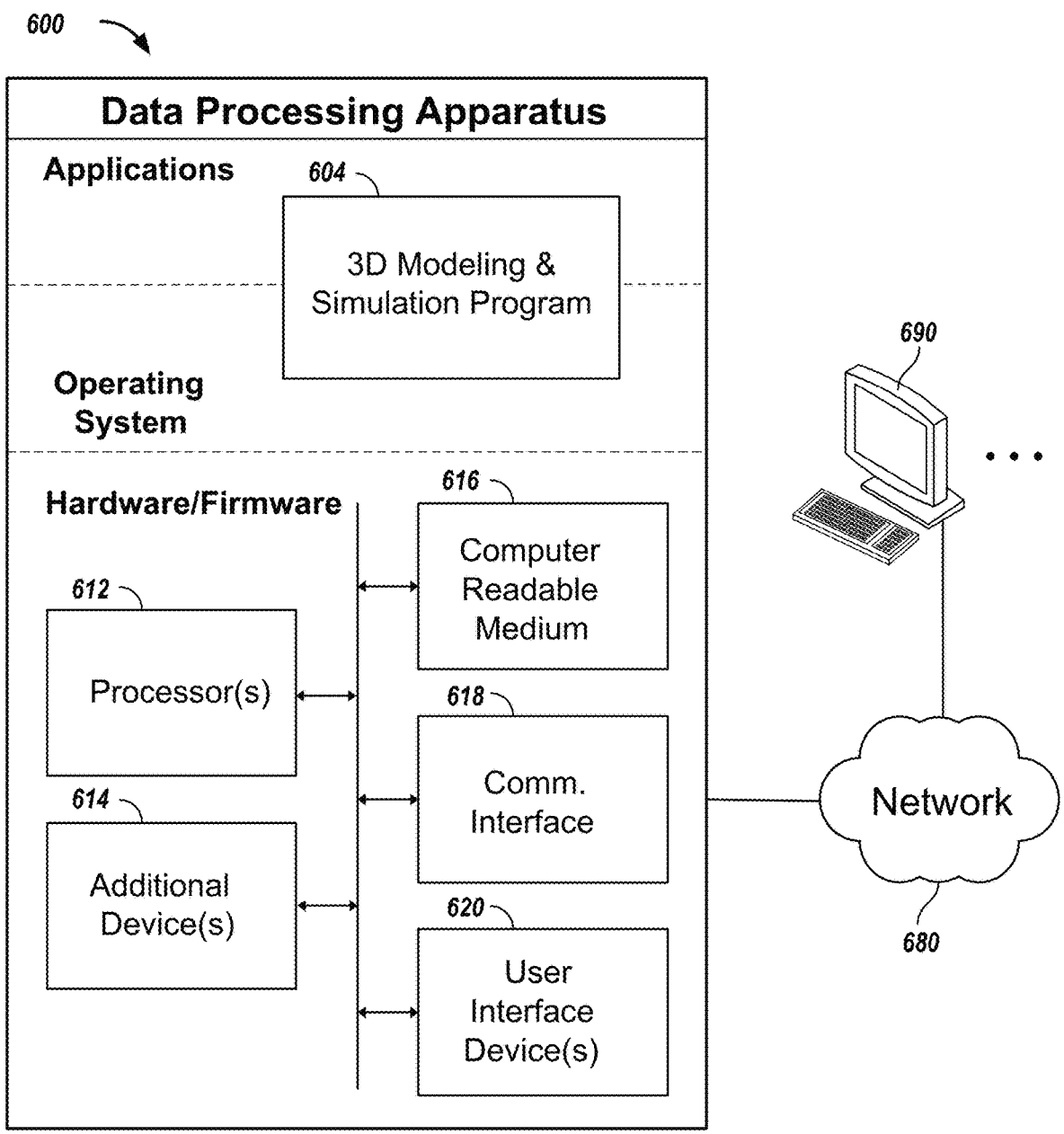
FIG. 6 is a schematic diagram of a data processing system usable to implement the described systems and techniques.

FIG. 6 is a schematic diagram of a data processing system including a data processing apparatus 600, which can be programmed as a client or as a server. The data processing apparatus 600 is connected with one or more computers 690 through a network 680. While only one computer is shown in FIG. 6 as the data processing apparatus 600, multiple computers can be used. The data processing apparatus 600 includes various software modules, which can be distributed between an application layer and an operating system. These can include executable and/or interpretable software programs or libraries, including tools and services of a 3D modeling and simulation program 604, such as described above. The number of software modules used can vary from one implementation to another. Moreover, the software modules can be distributed on one or more data processing apparatus connected by one or more computer networks or other suitable communication networks.

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor. Each processor 612 is capable of processing instructions stored on the computer readable medium 616 or on a storage device such as one of the additional devices 614. The data processing apparatus 600 uses its communication interface 618 to communicate with one or more computers 690, for example, over a network 680. Examples of user interface devices 620 include a display, a camera, a speaker, a microphone, a tactile feedback device, a keyboard, and a mouse. The data processing apparatus 600 can store instructions that implement operations associated with the program(s) described above, for example, on the computer readable medium 616 or one or more additional devices 614, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A method comprising:
   obtaining, by a numerical injection molding simulation program, a three-dimensional model of a mold and measured shrinkage data for at least one material;
   predicting, by the numerical injection molding simulation program, an amount of warpage for a part manufactured using the mold by computational simulation of an injection molding process, wherein the computational simulation uses an internal residual stress model for the part that uses calibrated values for both a coefficient of thermal expansion and an elastic modulus of the at least one material, in at least one direction, for at least thermal stress due to cooling and pressure compensation during a packing or holding phase of the injection molding process, wherein the calibrated values are calibrated in accordance with the measured shrinkage data for the at least one material; and
   providing the amount of warpage predicted for the part manufactured using the mold.

2. The method of claim 1, wherein obtaining the measured shrinkage data comprises loading the measured shrinkage data for the at least one material, at runtime for the computational simulation, from a database containing data about shrinkage for injection molded test samples, wherein the injection molded test samples have been produced under different molding conditions for the at least one material.

3. The method of claim 2, wherein the different molding conditions comprise different injection velocities, different mold pressure levels, and different polymer melt and mold temperatures used with different part geometries.

4. The method of claim 3, wherein the at least one material comprises different polymer material grades.

5. The method of claim 1, wherein the computational simulation calibrates the coefficient of thermal expansion in both a direction of flow of the at least one material and a direction perpendicular to the direction of flow based on a magnitude of shrinkage measured in each of the direction of flow and the direction perpendicular to the direction of flow, and the computational simulation calibrates the elastic modulus of the at least one material in both the direction of flow and the direction perpendicular to the direction of flow at an elevated temperature based on an observed sensitivity of measured shrinkage, in each of the direction of flow and the direction perpendicular to the direction of flow, due to variations in packing pressure.

6. The method of claim 5, wherein the predicting comprises:
finding, in the measured shrinkage data, shrinkage measurements that differ for the at least one material only in packing pressure;
determining a shrinkage measurement case, from the shrinkage measurements, that has a thickness corresponding to a thickness of the at least one material at a location in the three-dimensional model of the mold;
estimating, for the shrinkage measurement case, effective parallel and perpendicular compressibilities for the thickness for the at least one material;
calculating calibrated parallel and perpendicular elastic moduli from the effective parallel and perpendicular compressibilities;
predicting a residual stress at the location using the calibrated parallel and perpendicular elastic moduli for the at least one material and the calibrated coefficient of thermal expansion; and
using the residual stress at the location in the computational simulation of the injection molding process.

7. The method of claim 5, wherein the at least one material is a fiber reinforced polymer compound, and the computational simulation calibrates the coefficient of thermal expansion and the elastic modulus for a polymer matrix of the fiber reinforced polymer compound.

8. The method of claim 5, wherein the three-dimensional model of the mold defines cooling lines integrated into the mold and comprises a three-dimensional model of both a cavity of the mold and a core of the mold.

9. The method of claim 5, wherein the numerical injection molding simulation program is part of a numerical structural modelling program.

10. The method of claim 1, wherein the providing comprises presenting the amount of warpage predicted for the part on a display device along with an alert that the amount of warpage predicted for the part exceeds a predefined threshold.

11. The method of claim 1, wherein the providing comprises presenting the amount of warpage predicted for the part on a display device along with a suggested change in packing pressure control for the mold during the injection molding process to reduce or eliminate warpage of the part.

12. The method of claim 1, wherein the providing comprises presenting the amount of warpage predicted for the part on a display device along with a suggested change to the three-dimensional model of the mold to reduce or eliminate physical mold prototyping cycles.

13. A method comprising:
obtaining, by a numerical injection molding simulation program, a three-dimensional model of a mold and measured shrinkage data for at least one material;
predicting, by the numerical injection molding simulation program, an amount of warpage for a part manufactured using the mold by computational simulation of an injection molding process, wherein the computational simulation uses an internal residual stress model for the part that uses calibrated values for a coefficient of thermal expansion and for a Poisson's ratio of the at least one material, in at least one direction, for at least thermal stress due to cooling and pressure compensation during a packing or holding phase of the injection molding process, wherein the calibrated values are calibrated in accordance with the measured shrinkage data for the at least one material; and
providing the amount of warpage predicted for the part manufactured using the mold.

14. The method of claim 13, wherein obtaining the measured shrinkage data comprises loading the measured shrinkage data for the at least one material, at runtime for the computational simulation, from a database containing data about shrinkage for injection molded test samples, wherein the injection molded test samples have been produced under different molding conditions for the at least one material.

15. The method of claim 14, wherein the different molding conditions comprise different injection velocities, different mold pressure levels, and different polymer melt and mold temperatures used with different part geometries.

16. The method of claim 15, wherein the at least one material comprises different polymer material grades.

17. The method of claim 13, wherein the computational simulation calibrates the coefficient of thermal expansion in both a direction of flow of the at least one material and a direction perpendicular to the direction of flow based on a magnitude of shrinkage measured in each of the direction of flow and the direction perpendicular to the direction of flow, and the computational simulation calibrates the Poison's ratio of the at least one material in both the direction of flow and the direction perpendicular to the direction of flow at a temperature higher than room temperature, based on an observed sensitivity of measured shrinkage, in each of the direction of flow and the direction perpendicular to the direction of flow, due to variations in packing pressure.

18. The method of claim 17, wherein the predicting comprises:
finding, in the measured shrinkage data, shrinkage measurements that differ for the at least one material only in packing pressure;
determining a shrinkage measurement case, from the shrinkage measurements, that has a thickness corresponding to a thickness of the at least one material at a location in the three-dimensional model of the mold;
estimating, for the shrinkage measurement case, effective parallel and perpendicular compressibilities for the thickness for the at least one material;
calculating calibrated parallel and perpendicular Poisson's ratios from the effective parallel and perpendicular compressibilities;

calculating calibrated parallel and perpendicular coefficients of thermal expansion from the effective parallel and perpendicular compressibilities;

predicting a residual stress at the location using the calibrated parallel and perpendicular Poisson's ratios for the at least one material and the calibrated coefficients of thermal expansion; and using the residual stress at the location in the computational simulation of computational simulation of the injection molding process.

19. The method of claim 18, wherein the internal residual stress model for the part also uses calibrated values for an elastic modulus of the at least one material, in at least one direction, for at least thermal stress due to cooling and pressure compensation during a packing phase of the injection molding process, wherein the calibrated values for the elastic modulus are calibrated in accordance with the measured shrinkage data for the at least one material.

20. The method of claim 18, wherein the computational simulation further calibrates an elastic modulus of the at least one material in both the direction of flow and the direction perpendicular to the direction of flow at a temperature higher than room temperature, based on an observed sensitivity of measured shrinkage, in each of the direction of flow and the direction perpendicular to the direction of flow, due to variations in packing pressure.

21. The method of claim 18, wherein the predicting comprises:

calculating calibrated parallel and perpendicular elastic moduli from the effective parallel and perpendicular compressibilities;

predicting the residual stress at the location using the calibrated parallel and perpendicular Poisson's ratios, the calibrated elastic moduli, and the calibrated coefficients of thermal expansion for the at least one material; and using the residual stress at the location in the computational simulation of the injection molding process.

22. The method of claim 21, wherein calculating the calibrated parallel and perpendicular Poisson's ratios and elastic moduli comprises performing a numerical optimization to determine the calibrated parallel and perpendicular Poisson's ratios and elastic moduli from the effective parallel and perpendicular compressibilities.

23. The method of claim 18, wherein the at least one material is a fiber reinforced polymer compound, and the computational simulation calibrates the coefficient of thermal expansion and the Poisson's ratio for a polymer matrix of the fiber reinforced polymer compound.

24. The method of claim 23, wherein the computational simulation further calibrates the elastic modulus for the polymer matrix of the fiber reinforced polymer compound.

25. The method of claim 24, wherein calibrating the Poisson's ratio and the elastic modulus for the polymer matrix of the fiber reinforced polymer compound comprises performing a numerical optimization to determine the calibrated parallel and perpendicular Poisson's ratios and elastic moduli for the polymer matrix, wherein performing the numerical optimization comprises minimizing an objective function, the objective function comprising a residual function determined from a numerical calculation of parallel and perpendicular fiber reinforced polymer compound compressibilities and coefficients of thermal expansion from calibrated parallel and perpendicular Poisson's ratios and elastic moduli for the polymer matrix using an empirical equation that estimates a fiber orientation based on the thickness, and a penalty function that measures a deviation of the calibrated parallel and perpendicular Poisson's ratios and elastic moduli for the polymer matrix from default parallel and perpendicular Poisson's ratios and elastic moduli for the polymer matrix.

26. A system comprising:

one or more data processing apparatus; and a non-transitory computer-readable medium tangibly encoding a numerical injection molding simulation program operable to cause the one or more data processing apparatus to perform operations comprising obtaining a three-dimensional model of a mold and measured shrinkage data for at least one material, predicting an amount of warpage for a part manufactured using the mold by computational simulation of an injection molding process, wherein the computational simulation uses an internal residual stress model for the part that uses calibrated values for both a coefficient of thermal expansion and an elastic modulus of the at least one material, in at least one direction, for at least thermal stress due to cooling and pressure compensation during a packing or holding phase of the injection molding process, wherein the calibrated values have been calibrated in accordance with the measured shrinkage data for the at least one material, and providing the amount of warpage predicted for the part manufactured using the mold.

27. The system of claim 26, wherein obtaining the measured shrinkage data comprises loading the measured shrinkage data for the at least one material, at runtime for the computational simulation, from a database containing data about shrinkage for injection molded test samples, wherein the injection molded test samples have been produced under different molding conditions for the at least one material.

28. The system of claim 27, wherein the different molding conditions comprise different injection velocities, different mold pressure levels, and different polymer melt and mold temperatures used with different part geometries.

29. The system of claim 28, wherein the at least one material comprises different polymer material grades.

30. The system of claim 26, wherein the computational simulation calibrates the coefficient of thermal expansion in both a direction of flow of the at least one material and a direction perpendicular to the direction of flow based on a magnitude of shrinkage measured in each of the direction of flow and the direction perpendicular to the direction of flow, and the computational simulation calibrates the elastic modulus of the at least one material in both the direction of flow and the direction perpendicular to the direction of flow at an elevated temperature based on an observed sensitivity of measured shrinkage, in each of the direction of flow and the direction perpendicular to the direction of flow, due to variations in packing pressure.

31. The system of claim 30, wherein the predicting comprises:

finding, in the measured shrinkage data, shrinkage measurements that differ for the at least one material only in packing pressure;

determining a shrinkage measurement case, from the shrinkage measurements, that has a thickness corresponding to a thickness of the at least one material at a location in the three-dimensional model of the mold;

estimating, for the shrinkage measurement case, effective parallel and perpendicular compressibilities for the thickness for the at least one material;

calculating calibrated parallel and perpendicular elastic moduli from the effective parallel and perpendicular compressibilities;

predicting a residual stress at the location using the calibrated parallel and perpendicular elastic moduli for the at least one material and the calibrated coefficient of thermal expansion; and using the residual stress at the location in the computational simulation of the injection molding process.

32. The system of claim 30, wherein the at least one material is a fiber reinforced polymer compound, and the computational simulation calibrates the coefficient of thermal expansion and the elastic modulus for a polymer matrix of the fiber reinforced polymer compound.

33. The system of claim 30, wherein the three-dimensional model of the mold defines cooling lines integrated into the mold and comprises a three-dimensional model of both a cavity of the mold and a core of the mold.

34. The system of claim 30, wherein the numerical injection molding simulation program is part of a numerical structural modelling program.

35. The system of claim 26, wherein the providing comprises presenting the amount of warpage predicted for the part on a display device along with an alert that the amount of warpage predicted for the part exceeds a predefined threshold.

36. The system of claim 26, wherein the providing comprises presenting the amount of warpage predicted for the part on a display device along with a suggested change in packing pressure control for the mold during the injection molding process to reduce or eliminate warpage of the part.

37. The system of claim 26, wherein the providing comprises presenting the amount of warpage predicted for the part on a display device along with a suggested change to the three-dimensional model of the mold to reduce or eliminate physical mold prototyping cycles.

38. A system comprising:
one or more data processing apparatus; and
a non-transitory computer-readable medium tangibly encoding a numerical injection molding simulation program operable to cause the one or more data processing apparatus to perform operations comprising
obtaining a three-dimensional model of a mold and measured shrinkage data for at least one material,
predicting an amount of warpage for a part manufactured using the mold by computational simulation of an injection molding process, wherein the computational simulation uses an internal residual stress model for the part that uses calibrated values for a coefficient of thermal expansion and for a Poisson's ratio of the at least one material, in at least one direction, for at least thermal stress due to cooling and pressure compensation during a packing or holding phase of the injection molding process, wherein the calibrated values have been calibrated in accordance with the measured shrinkage data for the at least one material, and
providing the amount of warpage predicted for the part manufactured using the mold.

39. The system of claim 38, wherein obtaining the measured shrinkage data comprises loading the measured shrinkage data for the at least one material, at runtime for the computational simulation, from a database containing data about shrinkage for injection molded test samples, wherein the injection molded test samples have been produced under different molding conditions for the at least one material.

40. The system of claim 39, wherein the different molding conditions comprise different injection velocities, different mold pressure levels, and different polymer melt and mold temperatures used with different part geometries.

41. The system of claim 40, wherein the at least one material comprises different polymer material grades.

42. The system of claim 38, wherein the computational simulation calibrates the coefficient of thermal expansion in both a direction of flow of the at least one material and a direction perpendicular to the direction of flow based on a magnitude of shrinkage measured in each of the direction of flow and the direction perpendicular to the direction of flow, and the computational simulation calibrates the Poison's ratio of the at least one material in both the direction of flow and the direction perpendicular to the direction of flow at a temperature higher than room temperature, based on an observed sensitivity of measured shrinkage, in each of the direction of flow and the direction perpendicular to the direction of flow, due to variations in packing pressure.

43. The system of claim 42, wherein the predicting comprises:
finding, in the measured shrinkage data, shrinkage measurements that differ for the at least one material only in packing pressure;
determining a shrinkage measurement case, from the shrinkage measurements, that has a thickness corresponding to a thickness of the at least one material at a location in the three-dimensional model of the mold;
estimating, for the shrinkage measurement case, effective parallel and perpendicular compressibilities for the thickness for the at least one material;
calculating calibrated parallel and perpendicular Poisson's ratios from the effective parallel and perpendicular compressibilities;
calculating calibrated parallel and perpendicular coefficients of thermal expansion from the effective parallel and perpendicular compressibilities;
predicting a residual stress at the location using the calibrated parallel and perpendicular Poisson's ratios for the at least one material and the calibrated coefficients of thermal expansion; and
using the residual stress at the location in the computational simulation of computational simulation of the injection molding process.

44. The system of claim 43, wherein the internal residual stress model for the part also uses calibrated values for an elastic modulus of the at least one material, in at least one direction, for at least thermal stress due to cooling and pressure compensation during a packing phase of the injection molding process, wherein the calibrated values for the elastic modulus have been calibrated in accordance with the measured shrinkage data for the at least one material.

45. The system of claim 43, wherein the computational simulation further calibrates an elastic modulus of the at least one material in both the direction of flow and the direction perpendicular to the direction of flow at a temperature higher than room temperature, based on an observed sensitivity of measured shrinkage, in each of the direction of flow and the direction perpendicular to the direction of flow, due to variations in packing pressure.

46. The system of claim 43, wherein the predicting comprises:
calculating calibrated parallel and perpendicular elastic moduli from the effective parallel and perpendicular compressibilities;
predicting the residual stress at the location using the calibrated parallel and perpendicular Poisson's ratios, the calibrated elastic moduli, and the calibrated coefficients of thermal expansion for the at least one material; and using the residual stress at the location in the computational simulation of the injection molding process.

47. The system of claim 46, wherein calculating the calibrated parallel and perpendicular Poisson's ratios and elastic moduli comprises performing a numerical optimization to determine the calibrated parallel and perpendicular Poisson's ratios and elastic moduli from the effective parallel and perpendicular compressibilities.

48. The system of claim 43, wherein the at least one material is a fiber reinforced polymer compound, and the computational simulation calibrates the coefficient of thermal expansion and the Poisson's ratio for a polymer matrix of the fiber reinforced polymer compound.

49. The system of claim 48, wherein the computational simulation further calibrates the elastic modulus for the polymer matrix of the fiber reinforced polymer compound.

50. The system of claim 49, wherein calibrating the Poisson's ratio and the elastic modulus for the polymer matrix of the fiber reinforced polymer compound comprises performing a numerical optimization to determine the calibrated parallel and perpendicular Poisson's ratios and elastic moduli for the polymer matrix, wherein performing the numerical optimization comprises minimizing an objective function, the objective function comprising a residual function determined from a numerical calculation of parallel and perpendicular fiber reinforced polymer compound compressibilities and coefficients of thermal expansion from calibrated parallel and perpendicular Poisson's ratios and elastic moduli for the polymer matrix using an empirical equation that estimates a fiber orientation based on the thickness, and a penalty function that measures a deviation of the calibrated parallel and perpendicular Poisson's ratios and elastic moduli for the polymer matrix from default parallel and perpendicular Poisson's ratios and elastic moduli for the polymer matrix.

* * * * *